INVENTOR.
HUGH F. FROHBACH
BY Samuel Lindenberg
Arthur Freilich
ATTORNEYS

INVENTOR.
HUGH F. FROHBACH
BY Samuel Lindenberg
Arthur Freilich
ATTORNEYS

INVENTOR.
HUGH F. FROHBACH
BY Samuel Lindenberg
Arthur Freilich
ATTORNEYS

INVENTOR.
HUGH F. FROHBACH
BY Samuel Lindenberg
Arthur F. Freilich
ATTORNEYS 3,470,325

VIDEO SIGNAL ENCODING TECHNIQUE FOR REDUCED BANDWIDTH TRANSMISSION

Hugh F. Frohbach, Sunnyvale, Calif., assignor to Southern Pacific Company, San Francisco, Calif., a corporation of Delaware Filed Oct. 31, 1966, Ser. No. 590,911
Int. Cl. H04b 1/66
U.S. Cl. 179—15.55 14 Claims

ABSTRACT OF THE DISCLOSURE

A bandwidth compression system for two level signal transmission, such as is found in facsimile, is provided wherein a single analog signal is generated for representing the sequence of black to white transitions or two level signal transitions which occur within a predetermined sampling interval together with an indication of the first type of transition within said interval.

This invention relates to video signal encoding techniques for reducing the bandwidth required for transmitting these signals and more particularly, to improvements in facsimile systems therein.

In a Patent No. 3,243,507 to A. Macovski, there has been described a system for encoding the video signal obtained from a facsimile scanning system, by converting the signals into a sequence of binary bits. Thereafter, successive groups of bits are encoded into a sequence of analog signals. By transmitting these analog signals instead of the groups of video signals which go into making each analog signal, an increase in the rate of transmission is obtained.

In order to minimize the errors resulting when one analog level is mistaken for an adjacent one, due to noise, it is common practice to make the level assignment schedule such that adjacent levels differ in only one bit. The received analog level represents a particular pattern of two-level signals which occur during the sampling interval. However, the pattern assignment, as a function of analog level that might be optimum for transmission of binary data, is not necessarily optimum for a facsimile signal. At the receiver due to noise and systems imperfections, the recovered sequence of analog voltage levels may not be strictly quantized. Thus, if the received analog signal level is between the quantization levels that have been selected for decoding, the sequence of picture elements that will or should be printed in response to this intermediate analog level may not be proper.

An object of this invention is to provide an arrangement for encoding two-level video signals into analog signals and for decoding the analog signals in a manner so that the reconstructed video signal more truly resembles the encoded video signal.

Yet another object of the invention is the provision of an arrangement for encoding and decoding two-level video signals in a manner to provide either increased speed of transmission or the conservation of bandwidth.

Yet another object of the present invention is the provision of an improved and novel facsimile system.

These and other objects of this invention are achieved in an arrangement wherein a different and unique analog signal level is assigned to represent both the sequence of black to white transitions in a video signal which occur within a predetermined sampling interval and an indication of the first transition within said interval. At the receiver the analog signal is applied to a multiple threshold circuit which generates, in response thereto, a sequence of black and white video signals which substantially correspond to the black and white video signals represented by that analog level.

The novel feature of this invention is that the assignment schedule of the analog levels representative of the train of video signals, and the decoding format at the receiver, does not employ and need not employ quantized binary codes and discrete analog levels, but may be represented advantageously by a continuous format chosen to substantially correspond to the possible signal patterns which arise during a sampling interval.

The novel features that are considered characteristic of this invention are set forth with particularity in the appended claims. The invention itself, both as to its organization and method of operation, as well as additional objects and advantages thereof, will best be understood from the following description, when read in connection with the accompanying drawings, in which:

Table 1 shows one convenient assignment schedule for converting combinations of three binary bits ("0" representing a white picture element and "1" representing a black picture element), into analog signal levels.

TABLE I.—ASSIGNMENT SCHEDULE FOR $n=3$

| Bit sequence: | Level assigned |
|---|---|
| 100 | [1] 7 |
| 101 | 6 |
| 111 | 5 |
| 110 | 4 |
| 010 | 3 |
| 011 | 2 |
| 001 | 1 |
| 000 | [2] 0 |

[1] Highest.
[2] Lowest.

Figure 1:
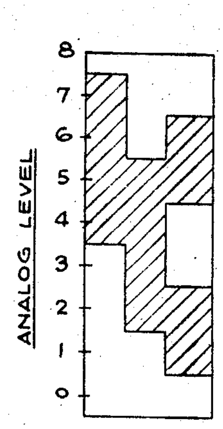
FIGURE 1 is a decoding format for binary data.

FIGURE 1 of the drawings represents a decoding format required with the assignment schedule shown in Table I. The format shown is for one picture sampling interval representing three picture elements. Thus, if the analog level 3 were received, this would represent three picture elements comprising white, black, white. Thus, FIGURE 1 is a geometrical diagram showing how the facsimile printer might be chosen to respond to any of a continuum of received analog levels from 0 to 8. (All values are normalized to correspond to those at the transmitter, Table I.) This diagram is called a decoding format. As pointed out, the meaning of the decoding format diagram may be seen by drawing a horizontal line across the diagram at a height corresponding to the analog level received at the start of a sampling interval. The black and white pattern intercepted by this horizontal line represents the pattern which will be printed during the sampling interval in response to that particular analog level. The reconstructed facsimile video signals then, will consist of a succession of various black and white patterns selected from the decoding format diagram at heights corresponding to the succession of analog levels received.

In accordance with this invention, the assignment schedule and the decoding format need not employ quantized binary codes and discrete analog levels, but may both be represented advantageously by a continuous format chosen to correspond reasonably well to the possible signal patterns. For example, the decoding format of FIGURE 2 includes all patterns of black and white which could be obtained with FIGURE 1, although not at the same analog levels. But, in addition, with the decoding format of FIGURE 2, many other patterns of black and white are available. The encoding circuit at the transmitter can be designed so that a receiver decoding to the format of FIGURE 2, would print the first white to black transition in precisely the position it was "seen" at the scanner. This is a significant improvement, from a facsimile standpoint, over treating a signal as if it were clocked binary data. (Binary data must be printed in coincidence with some master timing clock).

Figure 2:
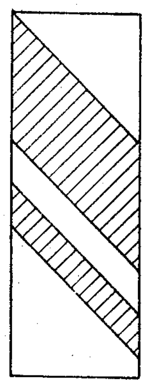
FIGURE 2 is a decoding format for video facsimile signals in accordance with this invention.
Figure 3:
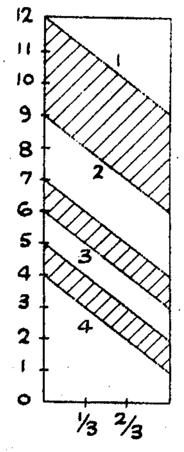
FIGURE 3 is a drawing representing a decoding format which is more flexible than that shown in FIGURE 2, and which is employed in the description of this invention.

FIGURE 3 is a decoding format alternative to FIGURE 2 which provides a wider choice of patterns at the expense of greater complexity. Both FIGURES 2 and 3 may be said to permit time bandwidth reduction by a factor of greater than 3, since they permit a greater selection of patterns than the corresponding quantized three element format of FIGURE 1.

It should be clear from the foregoing, that the choice of a decoding format is quite arbitrary, but the more complicated formats which might be envisaged require more complex transmitter encoding and receiver decoding circuitry. The generally desirable features of a decoding format are: (1) It should have a smooth transition from one black-and-white pattern to another as the analog level is varied in order to minimize the effects of noise on the printed pattern; (2) It should be as simple as possible while still allowing for all patterns which could be obtained with binary elements in a system having approximately the same time-bandwidth reduction factor.

In order to insure that a segment of the clipped two-level video signal can be qualitatively matched to some portion of the decoding format, it is advisable to restrict the number of transitions from one level to another within the sampling interval. A convenient way to accomplish this restriction is to use a lock-out circuit which has the property that it will provide an output which represents the input for a predetermined number of transitions during the sampling interval. If, for example, the lock-out circuit is set to represent no more than three transistions during a sampling interval, then there are only eight possible "quality types" of sample patterns which can occur during a sampling interval. Table II shows an encoding schedule, which may be used with FIGURE 3 wherein no more than three transitions are permitted to occur during a sampling interval. Table II also provides one possible way of assigning a unique analog level to a given video pattern, which uses the decoding format of FIGURE 3.

TABLE II

| Quality | Other condition | Transition of first column to be aligned with edge number of figure 3. |
|---|---|---|
| B | | All black, use level 9. |
| BW | | BW transition aligned with edge 1. |
| BWB | | WB transition aligned with edge 2. |
| BWBW | | WB transition aligned with edge 3. |
| WBWB | | (First) WB transition aligned with edge 4. |
| WBW | First white ≤⅓ sample interval. | WB transition aligned with edge 3. |
| | do | WB transition aligned with edge 4. |
| WB | First white ≤⅔ sample interval. | WB transition aligned with edge 2. |
| | do | WB transition aligned with edge 4. |
| W | | All white; use level 0. |

Under column indicated as "quality" is shown all of the possible transitions which can occur during a sampling interval. Under the column "Other Condition" the "WBW" is divided into two parts. The first part is used if the first white-to-black transition occurs within the first one-third of the sample interval, the second part is used when the white-to-black transition occurs after more than one-third of the sample interval has elapsed.

Similarly, the situation when a white-to-black transition occurs within a sampling interval is divided into two conditions. One of these is when the white signal extends for less than or equal to two-thirds of the sampling interval, and the second condition is when the white signal extends for more than two-thirds of the sampling interval.

The analog signal level which is selected is indicated as an alignment with one of the numbered edges shown in FIGURE 3. More specifically, if during a picture sampling interval, the picture starts out black, but then changes to white, analog levels which are more than 9 and less than 12 can represent this information. The one which is selected is determined by the time within the picture sampling interval at which the transition occurs. For example, if there is a "WBW" transition and the white-to-black transition has occurred after one-third of the sampling interval has elapsed, then an analog level is selected which is greater than 2 and less than 3. If the transition between a white and black occurred within the first one-third of the sampling interval, then an analog value of 5 or more and less than 6 may be accepted to represent the transitions of this interval depending upon the time of the occurrence of this first transition period.

FIGURES 4 through 8 are block schematic diagrams of the electronic circuitry required to encode a two-level video signal such as may be derived from a clipped facsimile signal, in accordance with this invention. As may be seen in FIGURE 4, a timing pulse generator 10 is used which provides, as an output, four clock pulses respectively designated as T, R, F and L. The T or transfer clock pulse, is represented by the waveform 12 and it provides the narrow T pulses just at the end of a sampling interval. The waveform 14 represents the reset, or R pulse, which occurs just after the commencement of a sampling interval. The F or first pulse waveform 16 and the L or last waveform 18 are pulses which respectively extend over the first one-third of the sampling interval, and over the last one-third of a sampling interval. A timing pulse generator may be any one of the well known clock pulse generators which can drive one-shot multivibrator circuits to provide the required pulses.

Figure 5:
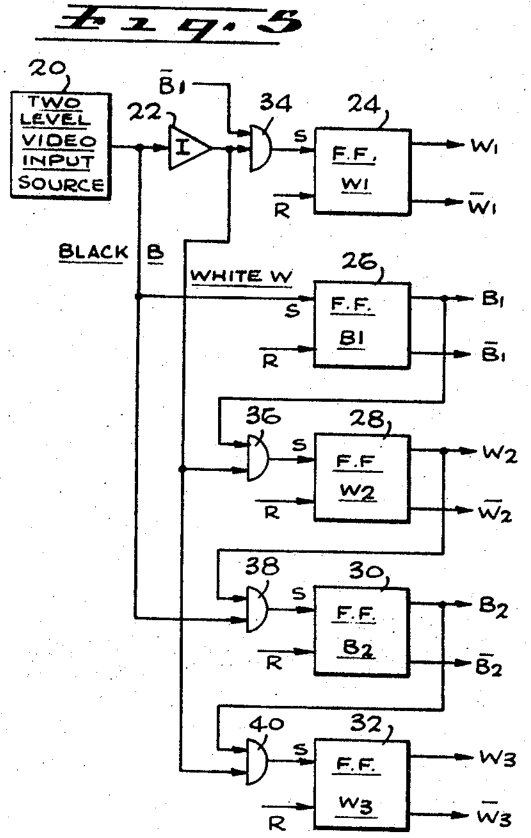
FIGURES 5, 6 and 7 are block diagrams illustrative of logical arrangements for generating the signals required for producing an analog signal representative of video signals in accordance with this invention.
Figure 4:
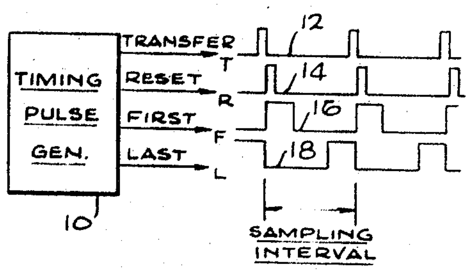
FIGURE 4 is a block diagram illustrative of a timing pulse generator and the waveforms generated thereby, which are required in the operation of this invention.

FIGURE 5 is a block schematic diagram of an arrangement for indicating the qualitative behavior of the video during a sampling interval. The two-level video input signal source 20, which may be the clipped facsimile signal, provides an output only in the presence of a black signal. In the absence of a black signal its output is representative of the presence of a white signal. Thus, signals from the source 20, which are representative of black signals, are applied to an inverter 22, whose output is present in the absence of input, whereby the output of the inverter represents white signals.

Five flip-flops respectively, 24, 26, 28, 30 and 32, are employed in this circuit. The output of the flip-flop 24 indicated as $W_1$ and $\overline{W}_1$ respectively designate the presence or absence of the first white signal. The output of the flip-flop 26, $B_1$ or $\overline{B}_1$ respectively designates the presence or absence of the first black signal. The output of flip-flop 28, $W_2$ or $\overline{W}_2$ respectively designates the presence or absence of a second white signal, although as it will be shown, $W_2$ does not necessarily imply there was a $W_1$ but does imply that $B_1$ was present. In other words, the presence of a $W_2$ signal is indicative of the first white signal which follows the first black signal regardless of whether or not there was a white signal prior to this first black signal.

The output of flip-flop 30 comprises $B_2$ or $\overline{B}_2$ indicative of the presence or absence of a second black signal. The output of flip-flop 32, $W_3$ or $\overline{W}_3$ indicates the presence or absence of a white signal following the second black signal.

The inverter 22 output is connected to an AND gate 34, which require the presence of $\overline{B}_1$ as well as a "white" signal before the AND gate 34 can produce an output to drive the flip-flop 24 to its set state wherein it will produce a $W_1$ output. In other words, flip-flop 24 will not produce an output should a first black signal have occurred.

Flip-flop 26 is driven to its set state upon the occurrence of a black signal within the sampling interval. Flip-flop 28 is driven to its set state in response to the output of an AND gate 36, which occurs only in the presence of a white signal and a $B_1$ signal being applied to its input. In other words, flip-flop 28 is driven to its set state only upon the occurrence of a white signal after a black signal.

Flip-flop 30 is driven to its set state by the output of an AND gate 38. This AND gate has, as its two applied inputs, a black signal and a $W_2$ signal. In other words, this flip-flop is driven to its set state in the presence of a black signal which occurs after a white signal, which in turn has followed a black signal. Flip-flop 32 is driven to its set state by the output of an AND gate 40. This AND gate receives as its inputs the $B_2$ signal and a white signal. Flip-flop 32 is driven to its set state in response to the occurrence of a white signal, after a second black signal.

All of the flip-flops 24 through 32 are reset in response to an R signal from the timing pulse generator 10. Thus, they are reset substantially immediately upon the occurrence of the beginning of the sampling interval.

The logical equations for obtaining the set outputs of flip-flops 24 through 32 are as follows:

$$W_1=\overline{V}\overline{B}_1$$
$$B_1=V$$
$$W_2=B_1\overline{V}$$
$$B_2=W_2V$$
$$W_3=B_2\overline{V}$$

where V=black and $\overline{V}$=white

Figure 6:
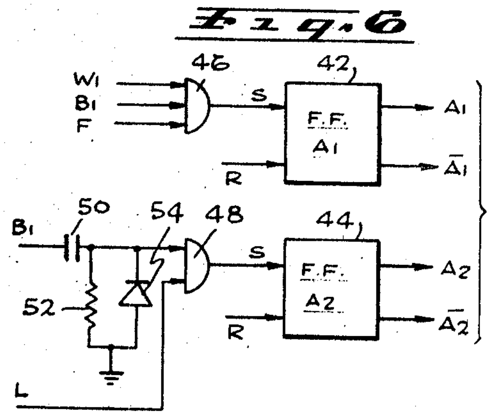

In order to determine the conditions set forth in Table 2 under the column "Other Condition," circuitry indicated in FIGURE 6 is required. Flip-flop 42 provides an output $A_1$ if the first transition was a white-to-black transition, occurring within the first one-third of the sampling interval. A flip-flop 44 provides an output if the first transition was from white-to-black and occurred within the last one-third of the sampling interval. The situation causing flip-flop 42 to provide an $A_1$ output occurs in response to the output of an AND gate 46 connected to its set input. AND gate 46 requires three inputs respectively $W_1$, $B_1$ and F. Thus $A_1=W_1B_1F$.

Flip-flop 44 is driven to its set state by the output of an AND gate 48. The two required inputs to the AND gate are the L signal which occurs during the last one-third of a sampling interval and the leading edge of a $B_1$ signal, indicated as $B_1'$. Thus, should a $B_1$ signal have been present before the commencement of the L signal, AND gate 48 will not produce an output. But should a $B_1$ signal be initiated by flip-flop 26 being driven during the duration of an L signal, then a leading edge circuit comprising a serial capacitor 50, and shunt connected resistor 52, in parallel with a diode 54, will permit only the leading edge of this signal to be applied to the AND gate 48. Both flip-flops 42 and 44 are reset by the R signal. The logical equation for $A_2$ is $A_2=B_1'L$.

Figure 7:
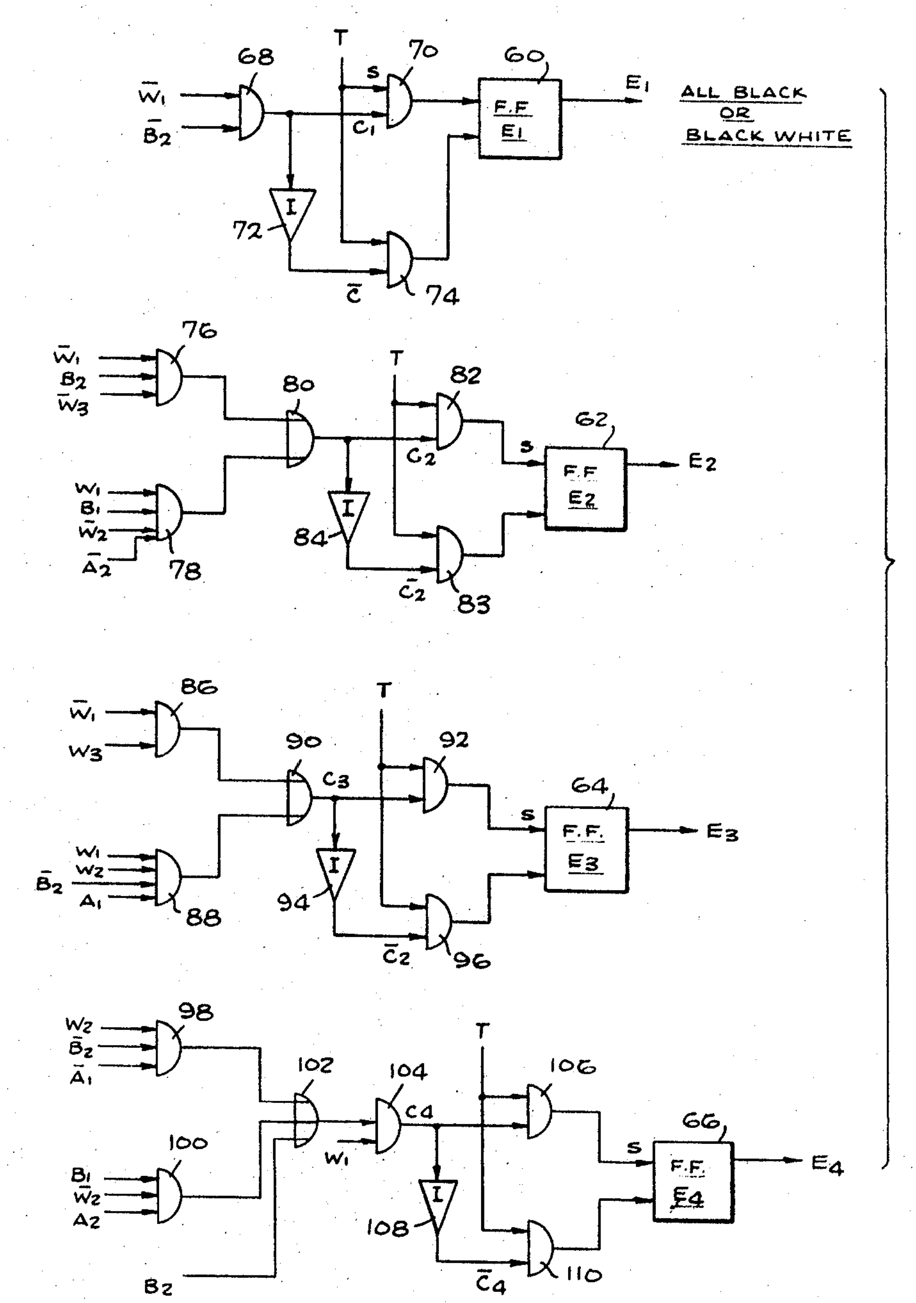

FIGURE 7 shows a block schematic diagram of circuitry required to determine the edges of FIGURE 3 which are specified by the quality of the video signal applied to the encoding circuitry. At the end of each sampling interval, as indicated by the occurrence of the transfer pulse T, one of the four flip-flops respectively 60, 62, 64, 66, is set as determined by the outputs of flip-flops 24 through 32, and 42 and 44 at that time. An AND gate 68 produces an output in the presence of $\overline{W}_1$ and $\overline{B}_2$ inputs. The output of the AND gate 68 is applied to another AND gate 70, and to inverter 72. The AND gate 70, in the presence of the transfer pulse T and in the presence of the output of the AND gate 68 drives flip-flop 60 to its set state whereby an $E_1$ output is provided. The AND gate 72, in the absence of an output from the AND gate 68, and in the presence of the transfer pulse T drives the flip-flop 60 to its reset state. Thus, there is an output $E_1$ when the video signal, during the sampling interval, was either all black or black followed by white.

Table 2 shows that the edge "2" of FIGURE 3 is specified by two conditions. These are provided by the logic of the input to flip-flop 62. AND gate 76 provides an output in the presence of inputs $\overline{W}_1$, $B_2$ and $\overline{W}_3$. An AND gate 78 provides an output in the presence of four inputs. These are, $W_1$, $B_1$, $\overline{W}_2$ and $\overline{A}_2$. The outputs of AND gates 76 and 78 are applied to an OR gate 80.

The output of the OR gate is applied to an AND gate 82 and also to an inverter 84. AND gate 82 provides an output in the presence of the input from the OR gate 80 as well as a T or transfer pulse. Its output drives flip-flop 62 to its set state. Flip-flop 62 is reset in response to an output received from an AND gate 83. This occurs in response to the output of the inverter 84, and in response to a transfer pulse. AND gate 76 provides an output when the quality of the signal occurring during the sampling interval is "BWB." AND gate 78 provides an output when the quality of the signal occurring during the sampling interval is "WB" with the transition from white to black occuring before two-thirds of the sampling interval has elapsed.

The "edge 3" transitions as specified in Table II are for the "BWBW" transitions. This function is provided by an AND gate 86 having as its two required inputs $\overline{W}_1$ and $W_3$. An AND gate 88 senses the "WBW" quality with the additional qualification that the transition from the first white-to-black occurs in less than or equal to one-third of the sampling interval. The inputs to AND gate 88 are $W_1$, $W_2$, $\overline{B}_2$ and $A_1$.

The outputs of AND gate 86 and 88 are applied to an OR gate 90. The output of OR gate 90 is applied to another AND gate 92 and to an inverter 94. The output of the inverter 94 is applied to an AND gate 96. Upon the occurrence of transfer pulse T, should OR gate 90 be providing an output, then AND gate 92 is enabled to drive flip-flop 64 to provide an $E_3$ output. Should no output be received from OR gate 90, then AND gate 96 can reset flip-flop 64.

Flip-flop 66 provides an output $E_4$ when the quality of the signal occurring during the sampling interval is "WBWB" or "WBW" with the first white signal extending over more than one-third of the sampling interval, or "WB" with the first white signal extending more than two-thirds of the sampling interval. AND gate 98 takes care of the first of the specified conditions, AND gate 100 takes care of the second of the specified conditions. AND gate 98 has applied to its input the signals $W_2$, $\overline{B}_2$ and $\overline{A}_1$. AND gate 100 has applied to its input the signals $B_1$, $\overline{W}_2$ and $A_2$. The outputs of the AND gates 98 and 100 are collected by an OR gate 102. An additional input to the OR gate 102 is a $B_2$ signal which, together with the $W_1$ signal which is applied to a succeeding AND gate 104, takes care of the third of the specified conditions. As may be surmised, the output of the OR gate is also applied to the AND gate 104.

The output of AND gate 104 is applied to a succeeding AND gate 106, and also to an inverter circuit 108. The inverter circuit is applied to an AND gate 110. AND gate 106 is enabled to drive the flip-flop 66 to its set state upon the occurrence of an output from AND gate 104 in the presence of a T pulse. Flip-flop 66 is reset by the output of AND gate 110 which occurs in the presence of a T pulse and no output from AND gate 104.

The foregoing may be set forth as the following logical equations: $E_1=T\overline{W}_1\overline{B}_2$, $E_2=T(\overline{W}_1B_2\overline{W}_3+W_1B_1\overline{W}_2\overline{A}_2)$, $E_3=T(\overline{W}_2W_3+W_1\overline{B}_2A_1)$, $$E_4=TW_1(W_2\overline{B}_2\overline{A}_1+B_1\overline{W}_2A_2+B_2)$$

Figure 8:
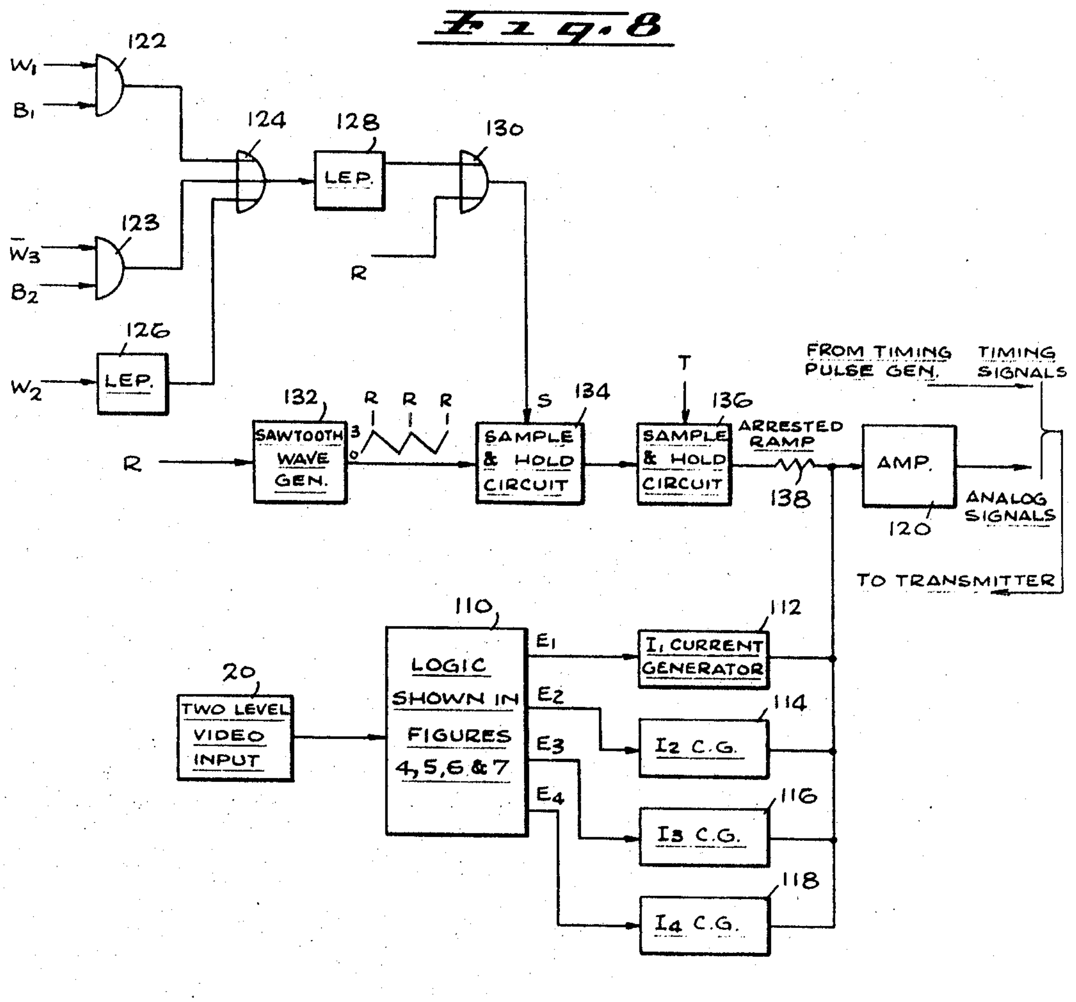
FIGURE 8 is a block diagram of an encoding arrangement at a transmitter in accordance with this invention.

Referring now to FIGURE 8, there may be seen a block diagram of the apparatus required for converting the video signals occurring during the sampling interval into a representative analog signal. The two-level video signal source 20 is shown connected to a rectangle 110 which represents the logical structure shown in FIGURES 1, 2, 3 and 4. The output of this structure will comprise one of the signals $E_1$, $E_2$, $E_3$ or $E_4$ which is indicative of the transitions which occur during a sampling interval. This signal gates on one of the $I_1$, $I_2$, $I_3$, and $I_4$ current generators respectively 112, 114, 116 and 118. A current generator is a well known circuit that may be an amplifier which produces a fixed current output only in the presence of an input. A different amplitude current is provided by each one of the current generators whereby a different analog signal is provided for representing all of the signal transitions by a different one of the outputs $E_1$ through $E_4$. Each one of the current generators has its output connected to the input to an amplifier 120 where it is added to another analog signal whose amplitude is indicative of the time of the occurrence of the first transition within a sampling interval.

An AND gate 122 provides an output in response to a $W_1$ and $B_1$ signal, which occur upon a transition from a first white to a first black signal. A second AND gate 123 provides an output in response to a $\overline{W}_3$ signal and a $B_2$ signal, which occurs when a second black signal is produced after a first black followed by a white signal. The AND gate outputs are applied to an OR gate 124. A third input to the OR gate is a signal generated upon the occurrence of a $W_2$ signal. This occurs either as the first white following a first black signal or the second white signal which has been preceded by a white and then a black signal. The $W_2$ signal is applied to a leading edge pulse circuit 126. A suitable arrangement for this circuit is shown in FIGURE 6 as one of the inputs to the AND gate 48. The output of OR gate 124 is applied to the following leading edge pulse circuit 128. The output of the leading edge pulse circuit is applied to another OR gate 130 which receives, as an alternative input, a reset signal pulse R. The output of OR gate 130 is thus a sequence of pulses comprising pulses coincident with (a) the reset pulses R, and (b) the time of occurrence of the first white-to-black transition, and (c) the time of the first black-to-white transition, but only if its occurs before the first white-to-black transition. This output of OR gate 130 is called the sampling signal S.

The reset signal pulse R serves to time the generation of a saw-tooth wave output by a saw-tooth wave generator 132. The duration of the descending ramp of the saw-tooth wave is substantially the duration of a sample pulse interval. A sample-and-hold circuit 134 will sample and hold the ramp signal at the time that it receives an input. At the occurrence of the R signal the sample-and-hold circuit is cleared or reset. When the OR gate 130 provides an output S during the sampling interval, this causes the sample-and-hold circuit to provide, as an output, a signal whose amplitude is that of the saw-tooth ramp at the time of the occurrence of the signal S. The largest amplitude signal occurs at the beginning of the picture sampling interval and the later the occurrence of a transition, the smaller the amplitude of the signal held. Accordingly, the output of the sample-and-hold circuit 134 is a signal whose amplitude is indicative of the time of occurrence of a transition within the picture sampling interval.

The output of the sample-and-hold circuit 134 is applied to a following sample-and-hold circuit 136 which, at the end of the picture sampling interval in response to a T pulse, samples the output of the circuit 134 whereby this output can be applied through a resistor 138 to the input of the amplifier 120 which adds it to the signal produced by one of the current generators 112 through 118. Thus, the signal obtained from the amplifier 120 is an analog signal representing both the quantity of the transitions within a picture interval as well as the time of the occurrence of the first transition. These signals, together with the timing signals, are transferred in well known manner to a facsimile receiver. It should be noted that a suitable sample-and-hold circuit may be found described for example in an article entitled "DC Accuracy in a Fast Box Car Circuit" by Harris and Simmons, published in IEEE Transactions on Electronic Computers, volume EC–13, No. 3, June 1964.

The value of current which may be selected for each one of the current generators may be made to correspond with the levels shown in FIGURE 3. Thus, the relative values of voltage drop across resistor 138 corresponding to currents $I_1$, $I_2$, $I_3$ and $I_4$ are respectively 9, 5, 3 and 1.

Figure 9:
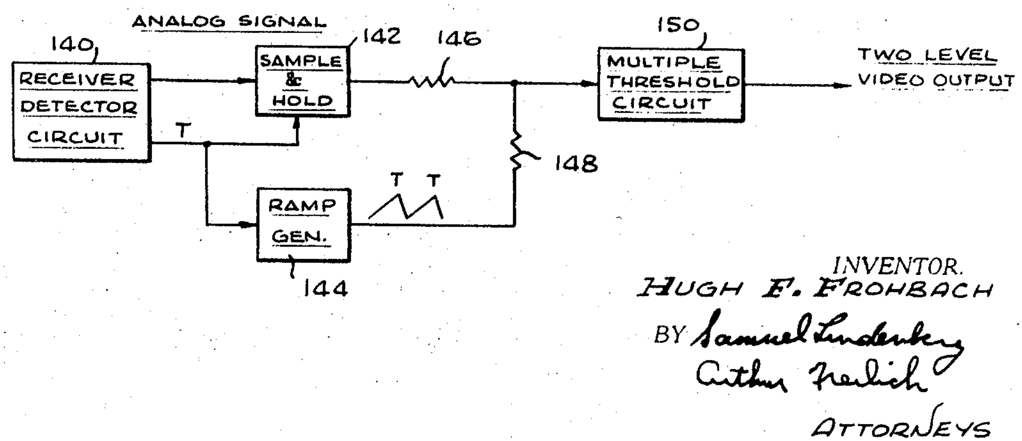
FIGURE 9 is a block diagram of a decoding arrangement at a receiver in accordance with this invention.

A block schematic diagram of the circuitry at the receiver for decoding the analog signals is shown in FIGURE 9. It should be clear that at the receiver, assuming a noise-free case, the pattern printed may not necessarily be exactly the same as the pattern of the video sample, but it will have the same quality; and further, one of the transitional edges will be printed in exactly the proper place. In any case, the pattern printed will be an equal or better approximation to the original video sample than could be obtained with the clocked binary multi-level data system.

Decoding of the analog signal generated by the arrangement shown in FIGURE 8 may be accomplished by the arrangement for the receiver shown in block diagram form in FIGURE 9. The receiver detector circuitry 140 receives and separates the analog signals from the timing pulses such as T. The analog output signal from the receiver detector circuit 140 is applied to a sample-and-hold circuit 142 as is also the T or transfer pulses. As a result, over a sampling interval the sample-and-hold circuit 142 provides an output which is the analog signal representative of the transitions in the video signal which have occurred during the sampling interval as well as the time of the first transition. The transfer pulses T are also applied to a ramp generator 144. This ramp generator is synchronized by these T pulses to generate a saw-tooth wave which commences to increase at the commencement of the picture sampling interval and reaches a peak at the end of the picture sampling interval at which time it drops to a minimal value, again to be triggered by the next T pulse.

The output of the sample-and-hold circuit 142 and of the ramp generator 144 are summed by means of two summing resistors respectively 146 and 148, which have their ends connected together and then to a multiple threshold circuit 150. Accordingly, the input to the multiple threshold circuit at the commencement of a picture sampling interval is a signal whose amplitude initially is that of the received analog signal and thereafter increases continuously until the end of the picture sampling interval. The multiple threshold circuit produces an output comprising a train of two-level video signals which represent the black-to-white transitions which occur during each picture sampling interval.

Figure 10:
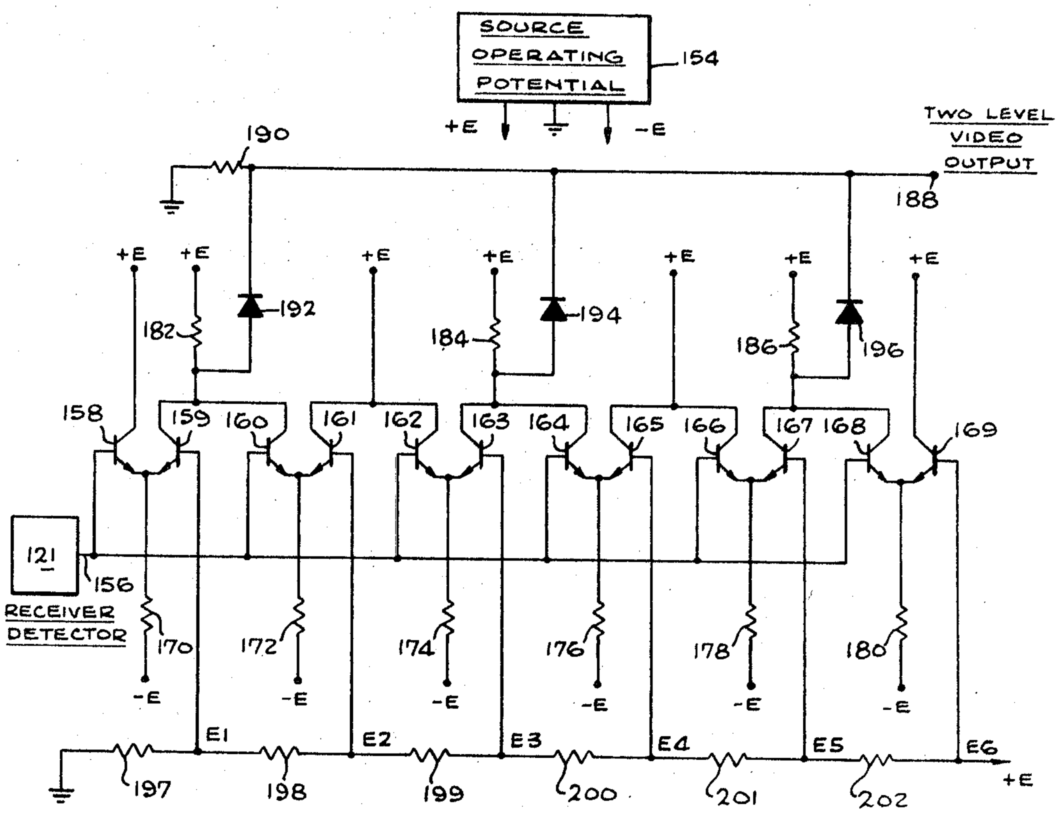
FIGURE 10 is a circuit diagram of a multiple threshold circuit employed at a receiver in accordance with this invention.
Figure 11:
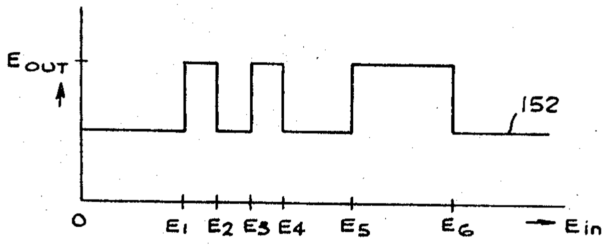
FIGURE 11 is a waveform diagram of the output-input characteristic of the multiple threshold circuit shown in FIGURE 10.

The receiver detector circuit, the sample-and-hold circuit and the ramp and generator circuit represented in FIGURE 9 are well known circuits and accordingly will not be described herein. The multiple threshold circuit 150 is shown in FIGURE 10 and has an output-input characteristic represented in FIGURE 11. The abscissa E in FIGURE 11 represents the increase in voltage which occur at the input in response to the addition of the analog and the rising ramp signal. In the absence of an analog signal the peak ramp amplitude should be just less than $E_1$. The sum of the maximum amplitude analog signal and ramp signal may equal or exceed $E_6$. The different level analog signals plus the ramp signal, within a picture interval range between the values of $E_1$ and $E_6$. The output-input characteristics could also be considered to be a video output signal produced by the multiple threshold circuit in response to a continuously rising input signal which ranges up through $E_6$. In the operation of the receivers, the actual input is a succession of constant-slope ramp segments each starting from a value corresponding to the received analog levels.

Referring now to a circuit diagram of the multiple threshold circuit 150, shown in FIGURE 10, a source of operating potential 154, provides operating potentials +E, −E, and ground or reference potential which is between the two. The input from the summing resistors 146 and 148 is applied to an input bus terminal 156. This applies the input signals to the base electrodes of transistors 158, 160, 162, 164, 166 and 168. These transistors have their emitters respectively connected to the emitters of the associated transistors, 159, 161, 163, 165, 167 and 169, and also to the −E potential source through the respective emitter resistors 170, 172, 174, 176, 178 and 180.

The collector of transistor 158 is connected directly to +E. Collectors of transistors 159 and 160 are connected together and to +E through a load resistor 182. Collectors of transistors 161 and 162 are connected together and directly to the +E terminal. Collectors of transistors 163 and 164 are connected together and to the +E potential source through a load resistor 184. Collectors of transistors 165 and 166 are connected together and to the +E terminal. Collectors of transistors 167 and 168 are connected together and through a load resistor 186 to the +E terminal. Collector 169 is connected directly to the +E potential terminal. An output terminal 188 is connected through a load resistor 190 to ground. The collectors 159 and 160 are connected to the output terminal 188 through a diode 192. The diode 194 connects the output terminal 188 to the collectors 163 and 164. The diode 196 connects the collectors 167 and 168 to the output terminal 188. A resistance divider comprising serially connected resistors 197, 199, 200, 201 and 202, is connected between the +E potential source and ground. The resistors values are selected so that the voltages at their respective junctions correspond to the voltages $E_1$ through $E_6$ shown in the output-input characteristic diagrammed in FIGURE 11. The $E_1$ junction between resistors 197 and 198 is connected to the base of transistor 159. The $E_2$ junction between resistors 198 and 199 is connected to the base of transistor 161. The $E_3$ junction between resistors 199 and 200 is connected to the base of transistor 163. The $E_4$ junction between resistors 200 and 201 is connected to the base of transistor 165. The $E_5$ junction between resistors 201 and 202 is connected to the transistor base 167. The $E_6$ junction is connected to the base of transistor 169.

In the quiescent state, with no input there is no output, transistors 158, 160, 162, 164, 166, and 168 are maintained non-conductive by virtue of the remaining emitter coupled transistors being maintained conductive. An input signal which exceeds $E_1$ renders transistor 158 conductive whereby transistor 159 is rendered non-conductive and the junction of collectors 159 and 160 rise up toward the +E potential thus generating a positive pulse which is applied to the output terminal 188. If the input terminal continues to increase until it attains or exceeds the value $E_2$ then transistor 160 is rendered conductive and transistors 161 non-conductive. This drops the potential at the junction of collectors 159 and 160 and terminates the output pulse. Should the signal continue to increase at value $E_3$ transistor 162 is rendered conductive whereby transistor 163 is rendered non-conductive thereby generating another positive going pulse which is applied to the output terminal 188. Upon the input signal attaining the value $E_4$, transistor 164 is rendered conductive, terminating the output being derived through diode 194. Upon the attainment of the value $E_5$ by the input signal, transistor 166 is rendered conductive whereby an output pulse is applied through diode 196 to the output terminal 188. This signal will last until the input signal attains the value $E_6$ whereby transistor 168 is rendered conductive and the collector potential drops again so that no output is applied to terminal 188.

It should be noted that the widths of the intervals between output pulses as well as the output pulses themselves, are determined by the relative amplitudes of the voltages $E_1$ through $E_6$, since the rising ramp generated at the receiver carries the analog signal (when it is of sufficient amplitude) through these values at a constant rate.

Assume that the analog signal sent by the transmitter represents all black signals. The analog level at the start of the damp is equivalent to $E_5$. The multiple threshold circuit immediately provides a black representative signal. The ramp being added to the analog signal increases it from $E_5$ toward $E_6$. Accordingly, during the picture sampling interval only a black signal is generated by the threshold circuit.

Assume that the next analog which is received represents a "BW" transition signal which means that the analog signal will be made up from the output of the current generator $I_1$ which is a signal equivalent to $E_5$ plus an additional ramp signal, the amplitude of which is determined at the time of the transition between the black and the white signal. (Note FIGURE 8, $W_2$ input generates S signal to sample-and-hold circuit 134.) This time, the ramp signal generated by the ramp generator 144 at the receiver can carry the received analog signal through the $E_6$ value of voltage and therefore the black-white transition signal which occurs during the sampling interval will be reproduced, and since the time of the occurrence of the transition within the sampling interval determines the initial amplitude of the received signal the transition will occur at the proper time.

Assume now a signal having the "WBW" quality with the first white duration being less than one-third of the sampling interval. This would cause the $I_3$ generator to produce an output to which is added a portion of the ramp signal which occurs when the first white-to-black transition ($W_1$, $B_1$) occurs. The resultant analog signal would have a value between $E_2$ and $E_3$, as determined by when the occurrence of the first white-to-black transition takes place. This then is added to the rising ramp signal at the receiver whereby the output of the multiple threshold circuit will commence with a white signal output, since the initial signal value is somewhere between $E_2$ and $E_3$. Then, when the input signal passes through the $E_3$ value, the output is a black signal. The ramp generator at the receiver carries the signal applied to the multiple threshold circuit through the $E_4$ value thereby dropping the output signal to white again.

From the foregoing explanation it should be obvious by now how the multiple threshold circuit operates to decode the received analog signal so that the video signal presented at the output represents the initially encoded video signal during each successive picture interval.

There has accordingly been described and shown herein a novel, and useful system for encoding a plurality of video signals during a picture sampling interval in a manner so that a single analog signal may carry information whereby a decoding circuit at the receiver can reproduce the video signals occurring during the sampling interval and also indicate accurately the time of the first transition between black and white signals.

What is claimed is:

1. A system for encoding two-level video signals obtained from a source of said signals comprising:
- timing means producing resetting signals for establishing successive sampling intervals;
- first means to which said video signals and said resetting signals are applied for establishing a pattern of signals representative of the two-level video signal sequence occurring within a sampling interval;
- second means to which the pattern of signals of said first means is applied for establishing a single analog signal having an amplitude representative of the signal pattern produced by said first means;
- third means for generating an analog signal having an amplitude representative of the time of the occurrence of a first transition between said two-level video signals within a sampling interval;
- means for adding the outputs of said second and third means for producing a single analog signal representative of the two-level video signal sequence within a sampling interval and the time of occurrence of one of said transitions; and
- means for utilizing said signal analog signal.

2. Apparatus as recited in claim 1 wherein:
- there is included a fourth means responsive to which the signal pattern output of said second means is applied for producing an output signal pattern indicative of the portion of a sampling interval over which a predetermined one of said two-level transition occurs; and
- means for applying the output of said fourth means to said second means together with the output of said first means.

3. Apparatus as recited in claim 1 wherein:
- said first means includes a plurality of flip-flop circuits each of which has a set and reset input, the application of signals to which respectively produce a set and reset output;
- means for applying a resetting signal from said timing means to the reset input of all of said flip-flops at the end of a sampling interval;
- a first, second and third AND gate, each having its output respectively connected to the set inputs of the first, third and fifth one of said flip-flops;
- means for applying one level of said two-level video signals to one of the inputs of said first, second and third AND gates;
- means for applying the reset output of the second of said plurality of flip-flops to the input of said first AND gate;
- means for applying the set output of the second of said flip-flops to an input of said second AND gate;
- means for applying the set output of the fourth of said flip-flops to said third AND gate;
- means for applying the other level of said two-level video signals to the set input of a second of said flip-flop circuits;
- a fourth AND gate having its output connected to the set input of said fourth of said flip-flops;
- means for applying said other of said two-level video signals to an input of said fourth AND gate; and
- means for applying the set output of the third of said flip-flops to the other input to said fourth AND gate.

4. Apparatus as recited in claim 1 wherein:
- said third means for generating an analong signal representative of the time of occurrence of a first transition etween said two-level signals with a sampling interval includes:
- means for generating a ramp signal having substantially the duration of a sampling interval;
- means for generating a sampling signal at the time of the occurrence of a transition between said two-level video signals; and
- means for deriving a sample of said ramp signal responsive to said sampling signal at the time of the occurrence of said sampling signal.

5. A system for transmitting serially generated two-level video signals provided from a source of said video signals comprising:
- timing means for generating reset signals for establishing predetermined length regular sampling intervals;
- means to which said reset signals and said video signals are applied for generating a first analog signal having an amplitude representative of the bilevel video signals occurring during a sampling interval;
- means for generating a second analog signal, having an amplitude representative of the time of occurrence of a transition between two-level video signals within said sampling interval;
- means for combining both said analog signals to provide a combined analog signal; and
- means for utilizing said combined analog signal.

6. Apparatus as recited in claim 5 wherein:
- said means for utilizing said combined analog signal includes:
- means for generating a rising ramp signal extending over the interval of the sampling interval;
- means for combining one of said ramp signals with one of said combined analog signals, multiple threshold means having the characteristic that as an input applied thereto exceeds predetermined threshold levels, a succession of two-level output signals are provided, said thresholds being determined for providing an output signal pattern substantially corresponding to the two level video signals encoded within a sampling interval; and
- means for applying said combined analog and ramp signal to the input of said multiple threshold circuit to produce a two-level video signal at the output corresponding to the video signals represented by the combined analog signal applied to the input.

7. Apparatus as recited in claim 5 wherein:
- said means for generating an analog signal representative of the two-level video signals occurring within a sampling interval comprises:
  - first flip-flop means for generating a pattern of output signals representative of the video signal levels which occur within a sampling interval;
  - second flip-flop means responsive to the pattern of signals of said first flip-flop means for generating output signals indicative of the duration of one of said two-level video signals within a sampling interval;
  - third flip-flop means for producing an analog signal representative of the bilevel video signals occurring within the sampling interval; and means for applying the outputs from said first and second flip-flop means to said third flip-flop means.

8. Apparatus as recited in claim 7 wherein:

said means for generating a signal representative of the time of occurrence of a transition between said two-level signals within an interval includes:

means for generating a ramp signal waveform extending for the duration of a sampling interval;

gate means responsive to the output signal pattern of said first flip-flop means for producing a sampling signal at the time of the occurrence of a transition between the two-level signals applied to the input of said first flip-flop means; and means responsive to said sampling signal for deriving from said ramp signal a signal having an amplitude representative of the time within the sampling interval of the occurrence of the transition between two video signals.

9. In a system wherein two level video signals produced in sequence from a source are encoded as a series of analog signals, each of which represents within the sequence of video signals occurring within a predetermined sampling interval, and the time of occurrence of at least one transition between two-level video signals within a sampling interval;

means for decoding said analog signal comprising:

means for generating a rising ramp signal extending over the interval of the sampling interval;

means for combining one of said ramp signals with each of said analog signals;

multiple threshold means having the characteristic that as an input applied thereto exceeds predetermined threshold levels, a succession of two-level output signals are provided, said thresholds being determined for providing an output signal pattern substantially corresponding to the two-level video signals encoded within a sampling interval; and means for applying said combined analog and ramp signal to the input of said multiple threshold circuit to produce a two-level video signal at the output corresponding to the video signals represented by the analog signal applied to the input.

10. A facsimile system including means for producing a sequence of two-level video signals;

timing means for producing spaced reset pulses for establishing regular intervals for sampling said two-level video signals between reset pulses;

first flip-flop means to which said two-level video signals and reset pulses are applied for establishing a signal pattern for each sampling interval representative of the video signal sequence within a sampling interval;

second flip-flop means responsive to the signal pattern output of said first flip-flop means for producing a signal representative of the duration of one of the two-level signals within a sampling interval;

third flip-flop means to which the output of said first and second flip-flop means is applied for producing a digital signal representative of the inputs thereto;

current generator means for producing responsive to said digital signal an analog signal representative thereof;

means for generating for each sample interval a descending ramp signal extending over said sampling interval;

means for detecting the occurrence of the first transition within a sampling interval between two-level video signals and for producing a sample pulse signal representative thereof;

means to which said sample pulse signal and said ramp signal are applied for producing an output signal having the amplitude of the ramp signal at the time said sampling signal is applied;

means for combining said output signal and said analog signal to produce a combined analog signal;

means for utilizing said analog signal.

11. Apparatus as recited in claim 10 wherein said means for utilizing said combined analog signal comprises decoding means to which said combined analog signal is applied for producing two-level video signals substantially identical with the two-level video signals encoded by said combined analog signal, said decoding means comprising means for each sampling interval for generating a rising ramp signal;

means for combining a rising ramp signal with said combined analog signal to produce a resultant signal;

multiple threshold means for producing in response to a signal applied to its input increasing over predetermined threshold levels a sequence of two-level output signals; and means for applying said resultant analog signal to said multiple threshold circuit means for producing a sequence of two-level signal responsive thereto.

12. Apparatus as recited in claim 10 wherein said first flip-flop means comprises first, second, third, fourth and fifth flip-flops each respectively having set and reset inputs and outputs, respectively designated as $W_1$, $\overline{W}_1$, $B_1$, $\overline{B}_1$, $W_2$, $\overline{W}_2$, $B_2$, $\overline{B}_2$, $W_3$, $\overline{W}_3$, where $W_1$, $B_1$, $W_2$, $B_2$, $W_3$, are the respective outputs produced by said first through fifth flip-flops upon receiving an input applied to their set inputs, the remaining outputs being present in the absence of a signal applied to their set inputs, and wherein V represents one of said two-level signals and $\overline{V}$ represents the other of said two-level video signals, and wherein the following logical equation represents the inputs applied to the respective set inputs of said first through said fifth flip-flops to provide the indicated $W_1$, $B_1$, $W_2$, $B_2$, and $W_3$ outputs:

$$W_1=\overline{VB}_1$$

$$B_1=V$$

$$W_2=B_2\overline{V}$$

$$B_2=W_2V$$

$$W_3=B_2\overline{V}$$

13. Apparatus as recited in claim 12 wherein said second flip-flop means for generating a signal indicative of the width of one of said two-level signals includes means for generating a first signal occurring during the first one-third of a sampling interval and extending over said first one-third;

means for generating a last signal occurring over the last one-third of a sampling interval and extending over said last one-third;

a first and second flip-flop each having a set input and a respective output designated as $A_1$, $\overline{A}_1$, $A_2$, $\overline{A}_2$;

means for applying a signal simultaneously to the set input of said first flip-flop responsive to $W_1$, $B_1$ and said first signal; and means for applying simultaneously to the set input of said second flip-flop a signal responsive to said last signal and the leading edge of a $B_1$ signal.

14. Apparatus as recited in claim 13 wherein said third flip-flop means comprises first, second and third and fourth flip-flops, each having a set input respectively designated as $C_1$, $C_2$, $C_3$ and $C_4$, the application of signals to which cause the respective flip-flops to produce a set output signal; and AND gate means for applying $C_1$, $C_2$, $C_3$ and $C_4$ signals to said respective first, second, third and fourth flip-flops responsive to signals as set forth in the following logical equations:

$$C_1=\overline{W}_1\overline{B}_2$$

$$C_2=\overline{W}_1B_2\overline{W}_3+W_1B_1\overline{W}_2\overline{A}_2$$

$$C_3=\overline{W}_1W_3+W_1W_2\overline{B}_2A_1$$

$$C_4=W_1(W_2\overline{B}_2\overline{A}_2+B_1\overline{W}_2A_2+B_2)$$

References Cited

UNITED STATES PATENTS

| | | | |
|---|---|---|---|
| 2,963,698 | 12/1960 | Slocomb | 340—172 |
| 3,243,507 | 3/1966 | Macovski | 178—6 |
| 3,333,109 | 7/1967 | Updike | 328—151 |
| 3,369,229 | 2/1968 | Dorros | 325—38 |
| 3,394,312 | 7/1968 | Pfeiffer et al. | 325—38 |
| 3,414,677 | 12/1968 | Quinlan | 179—15.55 |

OTHER REFERENCES

Gouriet, G. G., Proceedings of the Institute of Electrical Engineers, vol. 104, May 1967, "Bandwidth Compression of a Television Signal," pp. 265–272.

RALPH D. BLAKESLEE, Primary Examiner

A. B. KIMBALL, Jr., Assistant Examiner

U.S. Cl. X.R.

178—6; 325—38; 340—347, 355